R. COTTER.
Machine for Tarring Wire-Ropes.
No. 223,114. Patented Dec. 30, 1879.
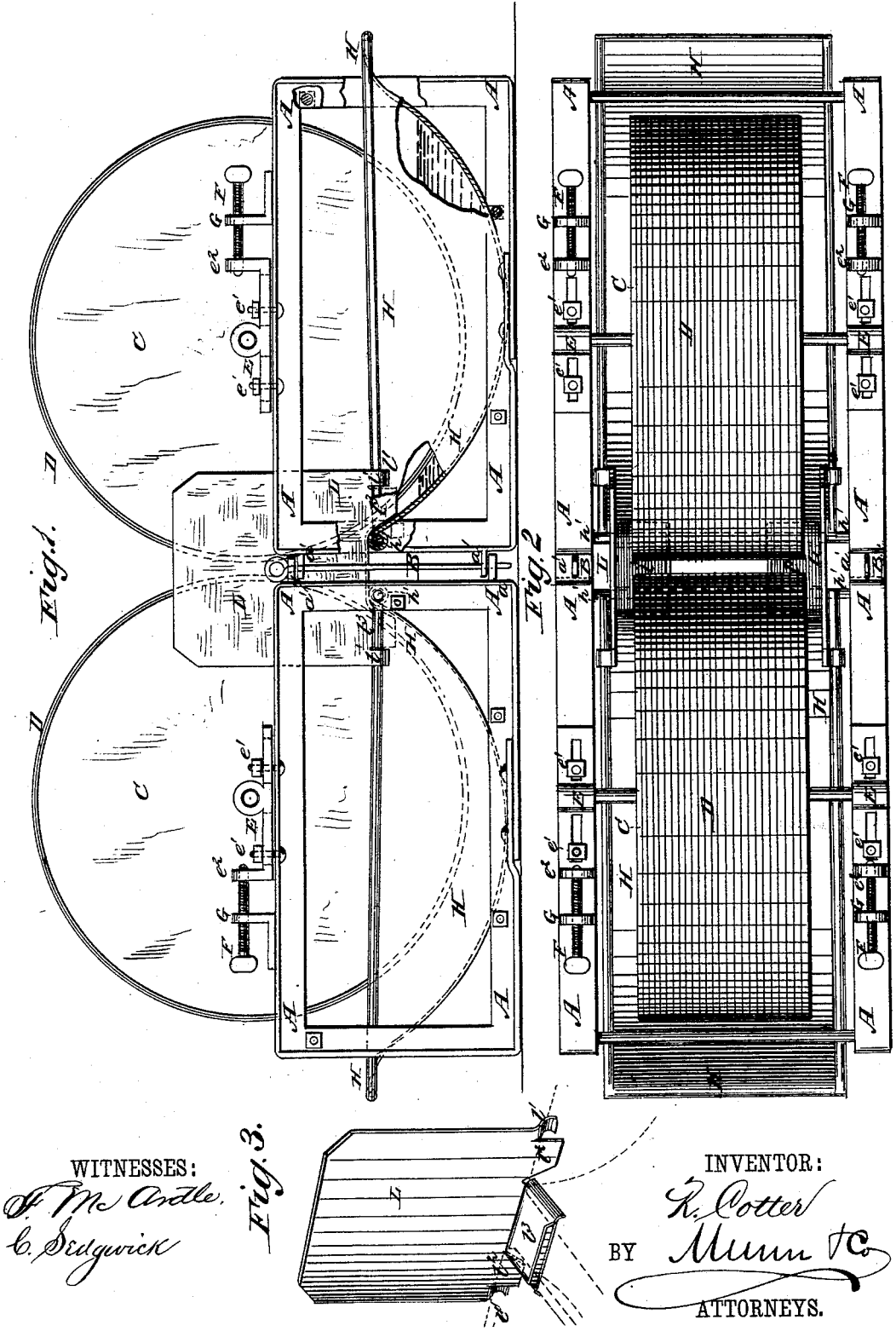

UNITED STATES PATENT OFFICE

RICHARD COTTER, OF VIRGINIA CITY, NEVADA.

IMPROVEMENT IN MACHINES FOR TARRING WIRE ROPES.

Specification forming part of Letters Patent No. 223,114, dated December 30, 1879; application filed June 5, 1879.

*To all whom it may concern:*

Be it known that I, RICHARD COTTER, of Virginia City, in the county of Storey and State of Nevada, have invented a new and useful Improvement in Machines for Tarring Wire Ropes, of which the following is a specification.

Figure 1 is a side view of my machine, parts being broken away to show the construction. Fig. 2 is a top view of the same. Fig. 3 is a detail perspective view of one of the guard-plates.

Similar letters of reference indicate corresponding parts.

The object of this invention is to furnish a machine for tarring flat and round wire ropes which shall be so constructed as to coat the ropes thoroughly with tar, force the tar into the crevices of the ropes, remove the surplus tar, and prevent it from running down the ropes, and which shall be simple in construction and convenient in use.

The invention consists in the combination of the two frames, provided with lugs at their inner ends to receive the coupling-pins, the two rollers faced with a soft material, the adjustable bearings, the adjusting-screws, and the two troughs, hinged at their inner ends, with each other; and in the combination of the guard-plates, provided with the strips at their lower ends, with the two rollers, the two frames, and the two troughs, as hereinafter fully described.

A are two rectangular frames, each of which is formed of two side frames connected together by cross rods or bolts. Upon the inner ends of the frames A are formed lugs $a'$, which have holes formed through them to receive the pins B, for connecting the said frames A together, as shown in Figs. 1 and 2.

C are two rollers, the faces of which are covered with old bagging, blankets, or other soft material, D, for applying the tar to the ropes. When the machine is to be used for tarring round ropes the faces of the rollers C should have grooves formed in them corresponding in size with the size of the ropes.

The journals of the rollers C revolve in bearings E, secured to the top bars of the frames A by bolts $e'$. The bearings E are slotted to receive the bolts $e'$, so that the said bearings E may be moved to adjust the rollers C closer to or farther from each other, according to the size of the rope to be tarred.

Upon the outer ends of the bearings E are formed upwardly-projecting lugs $e^3$, to which are swiveled the ends of hand-screws F, which pass through the screw-holes of supports, or stationary nuts G, secured to the top bars of the frames A, so that the rollers C may be adjusted forward or back by turning the said swiveled screws F.

H are two troughs, placed beneath the rollers C, to receive the tar. The troughs H rest upon the lower cross rods or bolts of the frames A, and their inner ends are hinged to the inner ends of the said frames A by pins or bolts $h'$.

With this construction the tar is poured into the troughs H or upon the rollers C, and is applied to the rope by the said rollers, the soft facings of the said rollers forcing the tar into all the crevices of the ropes, completely coating them, and at the same time wiping off the surplus tar, so that it will not run down the rope.

When the operation is nearly completed the outer ends of the troughs H are raised, which brings the bottoms of the said troughs H up against the faces of the rollers C, so that the said rollers will wipe out the said troughs.

The machine is especially intended for tarring the ropes of hoisting apparatus; but it may be used with advantage for tarring other ropes.

In using the machine, one or more planks are laid across the shaft, and the two frames A are placed upon them upon the opposite sides of the rope, and are secured to each other by inserting the coupling-pins B in the overlapped lugs $a'$. The rollers C are then adjusted by turning the swiveled screws F to bear against the rope with the desired pressure, so that as the rope is drawn downward the said rollers may be turned by friction, and may apply the tar to the said rope.

The tar that is squeezed out from between the rollers C is kept from wasting, and is guided back into the troughs H by the guard-plates L, placed opposite the adjacent sides of the said rollers C and within the frames A.

The lower edges of the plates L are slitted near the corners, and the narrow strips $l'$ thus formed are bent outward and downward to overlap the outer sides of the side edges of the troughs H, and serve as springs to keep the said guard-plates in place. The lower edges of the plates L are slitted upon the opposite sides of their middle parts, and the said middle parts, $e^2$, are then bent inward at right angles, or nearly so, and have their end edges bent upward to guide any tar that may be forced out against the said plates L back into the troughs H. The parts or strips $l^3$ between the side strips, $l'$ and $l^2$, overlap the inner sides of the side edges of the troughs H, to keep the said plates in place.

Having thus described my invention, I claim as new and desire to secure by Letters Patent—

1. The combination of the two frames A, provided with lugs $a'$ at their inner ends, the coupling-pins B, the two rollers C, faced with a soft material, D, the adjustable bearings E, the adjusting-screws F, and the two troughs H, hinged at their inner ends, with each other, substantially as herein shown and described.

2. The combination of the guard-plates L, provided with the strips $l'$ $l^2$ $l^3$ at their lower ends, with the two rollers C, the two frames A, and the two troughs H, substantially as herein shown and described.

RICHARD COTTER.

Witnesses:
W. H. ASH,
C. L. FOSTER.